(12) United States Patent
Salvetti et al.

(10) Patent No.: US 8,515,986 B2
(45) Date of Patent: Aug. 20, 2013

(54) QUERY PATTERN GENERATION FOR ANSWERS COVERAGE EXPANSION

(75) Inventors: Franco Salvetti, San Francisco, CA (US); Ying Tu, Redwood City, CA (US); David D Ahn, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 363 days.

(21) Appl. No.: 12/959,050

(22) Filed: Dec. 2, 2010

(65) Prior Publication Data

US 2012/0143895 A1 Jun. 7, 2012

(51) Int. Cl.
G06F 7/00 (2006.01)
G06F 17/30 (2006.01)

(52) U.S. Cl.
USPC .......................................................... 707/768

(58) Field of Classification Search
USPC ................................................. 707/765, 768
See application file for complete search history.

(56) References Cited

U.S. PATENT DOCUMENTS

| 7,418,443 B2 | 8/2008 | Yoshimura |
| 7,587,387 B2 | 9/2009 | Hogue |
| 7,937,349 B2 * | 5/2011 | Pucher ............................. 706/45 |
| 8,046,322 B2 * | 10/2011 | Wang et al. ...................... 706/48 |
| 2003/0074353 A1 | 4/2003 | Berkan et al. |
| 2003/0093276 A1 | 5/2003 | Miller et al. |
| 2004/0254919 A1 * | 12/2004 | Giuseppini ........................ 707/3 |
| 2006/0078862 A1 | 4/2006 | Goto et al. |
| 2007/0136246 A1 * | 6/2007 | Stenchikova et al. ............. 707/3 |
| 2008/0250008 A1 * | 10/2008 | Gollapudi et al. ................ 707/5 |
| 2009/0037398 A1 * | 2/2009 | Horvitz et al. .................... 707/4 |
| 2010/0235311 A1 | 9/2010 | Cao |
| 2011/0125734 A1 * | 5/2011 | Duboue et al. ................ 707/723 |
| 2012/0059838 A1 * | 3/2012 | Berntson et al. ............... 707/759 |
| 2012/0150832 A1 * | 6/2012 | Shah et al. ..................... 707/706 |
| 2012/0150838 A1 * | 6/2012 | Yin et al. ....................... 707/711 |
| 2012/0259829 A1 * | 10/2012 | Zhou ............................. 707/706 |

OTHER PUBLICATIONS

Pujeri et al., Constraint based Frequent Pattern mining for Generalized Query Templates from Web Log, International Journal of Engineering, Science and Technology, vol. 2, No. 11, pp. 17-33, published 2010.*

Web Question Answering Through Automatically Learned Patterns—Published Date: Jun. 11, 2004 http://ieeexplore.ieee.org/stamp/stamp.jsp?tp=&arnumber=1336147.

Searching for Definitional Answers on the Web Using Surface Patterns—Published Date: Apr. 2009 http://ieeexplore.ieee.org/stamp/stamp.jsp?tp=&arnumber=5054874.

* cited by examiner

*Primary Examiner* — Jeffrey A Burke

(74) *Attorney, Agent, or Firm* — Shook, Hardy & Bacon L.L.P.

(57) ABSTRACT

Answers are provided to users in response to queries as a supplement to any responsive documents. Query formats for entity and attribute combinations are identified. The query formats can be substituted with entity and attribute combinations that have a corresponding attribute value to form a list of answered queries. The attribute value corresponding to an answered query can be provided when a query is received that matches an answered query.

20 Claims, 9 Drawing Sheets

| J. K. Rowling book | J. K. Rowling books | J. K. Rowling novel | J. K. Rowling novels | J. K. Rowling works |
| j. k. rowlings book | j. k. rowlings books | j. k. rowlings novel | j. k. rowlings novels | j. k. rowlings works |
| William Shakespeare book | William Shakespeare books | William Shakespeare novel | William Shakespeare novels | William Shakespeare works |
| shakespear book | shakespear books | shakespear novel | shakespear novels | shakespear works |
| Julia Child book | Julia Child books | Julia Child novel | Julia Child novels | Julia Child works |
| child julia book | child julia books | child julia novel | child julia novels | child julia works |
| Jane Austen book | Jane Austen books | Jane Austen novel | Jane Austen novels | Jane Austen works |
| jane usten book | jane usten books | jane usten novel | jane usten novels | jane usten works |
| jane austin book | jane austin books | jane austin novel | jane austin novels | jane austin works |
| Isaac Newton book | Isaac Newton books | Isaac Newton novel | Isaac Newton novels | Isaac Newton works |
| newton book | newton books | newton novel | newton novels | newton works |

*FIG. 7*

| The number of queries | The number of distinct queries | Template | Valid? (y or n) |
|---|---|---|---|
| 147441 | 160 | <e> books | y |
| 20426 | 89 | <e> book | y |
| 14369 | 86 | books by <e> | y |
| 24544 | 68 | <e> novels | y |
| 22519 | 67 | <e> new book | n |
| 29896 | 63 | <e> book list | y |
| 3659 | 57 | list of <e> books | y |
| 519 | 55 | books <e> | y |
| 8843 | 53 | <e> facebook | n |
| 1718 | 53 | books written by <e> | y |
| 1003 | 52 | <e> book titles | y |
| 610 | 52 | <e> list of books | y |
| 266 | 52 | books of <e> | y |
| 1792 | 50 | read <e> books online | n |
| 737 | 47 | list of books by <e> | y |
| 908 | 47 | novels by <e> | y |
| 1628 | 47 | new <e> book | n |
| 890 | 45 | list <e> books | y |
| 325 | 43 | <e> audiobook | n |
| 271 | 43 | <e>books | y |
| 2444 | 43 | <e>'s new book | n |
| 759 | 42 | new <e> books | n |
| 359 | 41 | <e> book review | n |
| 193 | 41 | all books by <e> | y |
| 117 | 41 | <e>, books | y |
| 90 | 40 | <e> e-books | n |
| 1282 | 40 | <e> on facebook | n |
| 118 | 39 | <e> free ebooks | n |
| 10242 | 38 | <e> book tour | n |
| 1040 | 38 | all <e> books | y |
| 144 | 38 | <e> books for sale | n |
| 134 | 38 | <e> books on tape | n |
| 120 | 38 | book <e> | y |
| 645 | 37 | list of <e> novels | y |
| 458 | 37 | new books by <e> | n |
| 835 | 37 | best <e> books | n |
| 452 | 36 | <e> book series | n |
| 291 | 36 | best <e> book | n |
| 105 | 35 | free <e> audio books | n |
| 475 | 35 | <e> book signings | n |

*FIG. 8*

<e> books
<e> book
books by <e>
<e> novels
<e> book list
list of <e> books
books <e>
books written by <e>
<e> book titles
<e> list of books
books of <e>
list of books by <e>
novels by <e>
list <e> books
<e>books
all books by <e>
<e>, books
all <e> books
book <e>
list of <e> novels

*FIG. 9*

QUERY PATTERN GENERATION FOR ANSWERS COVERAGE EXPANSION

BACKGROUND

Many conventional search engines are designed to provide a series of responsive documents to a user based on a search query. However, a user of a search engine is not always looking for a document. Instead, many user queries are based on a user desire to learn a particular fact or a group of related facts. For example, a user may want to know the height of a mountain, the population of a city, or the names of books written by an author. The document listings provided by conventional search engines may provide such an answer, but to find the answer the user has to take the additional steps of accessing the document and reviewing the document for the desired information.

SUMMARY

In various embodiments, systems and methods are described for providing answers to users in response to queries as a supplement to any responsive documents. In some embodiments, the system and method can allow for an increased likelihood that a query will be recognized as a potential request for a fact based answer as opposed to a request for links to documents. In some embodiments, the system and method can increase the likelihood that queries with similar intent will return the same fact based answer.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein:

FIGS. 6-9 show examples of intermediate results at various stages during generation of query formats according to an embodiment of the invention.

DETAILED DESCRIPTION

Overview

Figure 1:
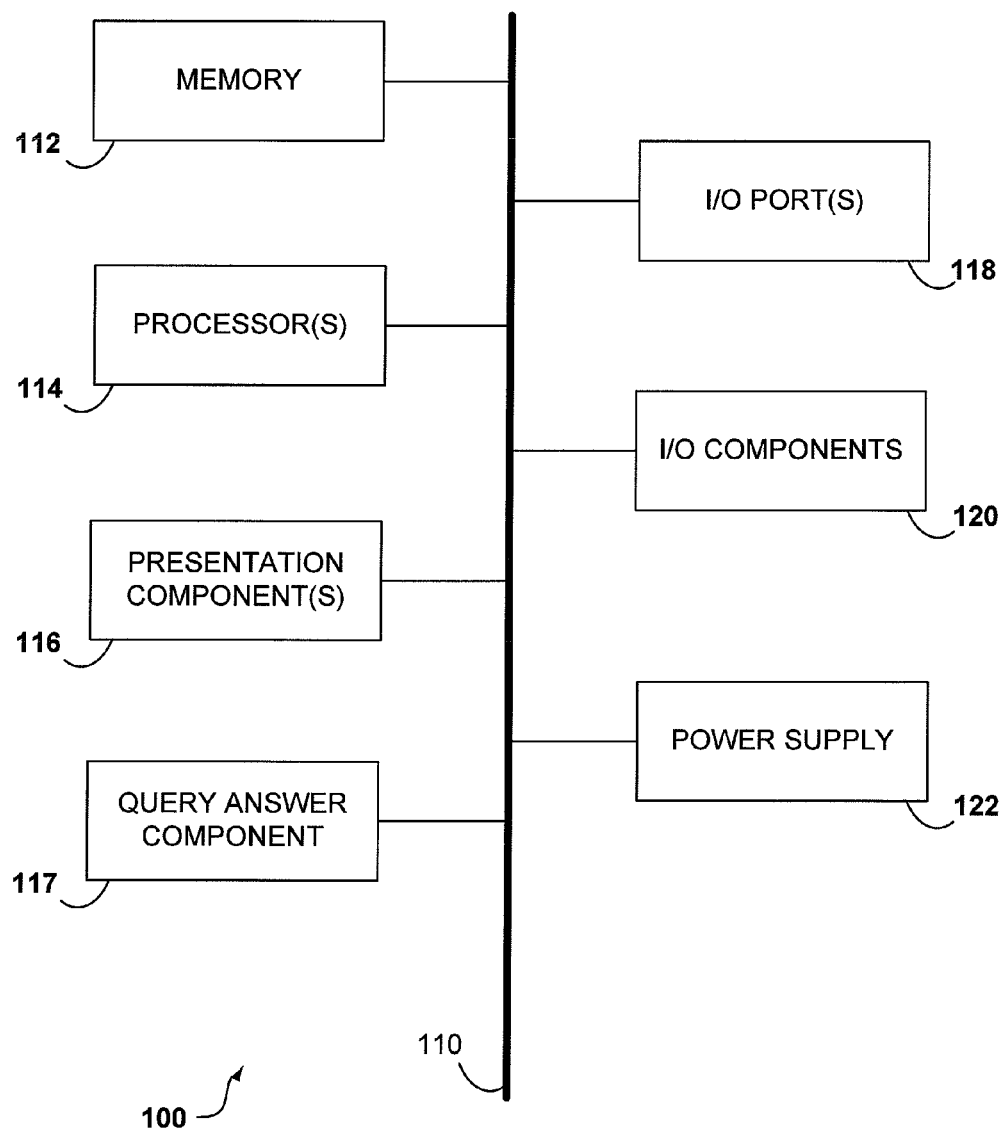
FIG. 1 is a block diagram of an exemplary computing environment suitable for use in implementing embodiments of the present invention.

When a user desires an answer to a query as opposed to a list of documents, the user can be presented with several challenges. Although the user desires only a piece of information, a conventional search engine will provide the user with a series of documents. The user may still have to sift through the documents to find the desired information. One solution to this problem can be to analyze snippets from the responsive documents in an effort to identify an answer for a query. However, the reliability of the snippets in the responsive documents may be difficult to determine.

An additional problem can be providing the same answer to queries with similar intent. For example, a user interested in a list of plays written by William Shakespeare might use a variety of different queries, such as "Shakespeare plays", "listing Shakespeare plays", "titles of Shakespeare plays", or "plays William Shakespeare." Of course, many other variations are also possible. With a conventional search engine, each different query potentially could provide a different set of responsive documents. Even if a fact database is available that contains the titles of the plays, the search engine has to recognize that a query has been submitted that shows intent for a fact based answer, as well as recognizing the fact requested by the query.

In various embodiments, systems and methods are provided that facilitate providing answers in response to search queries. The system and method employ a fact repository or database that contains potential answers or attributes associated with various entities. The entities and associated attributes can be used to generate an initial group of query forms. These query forms can be used to analyze queries from search logs to identify frequently used query patterns that demonstrate similar intent for an answer. The identified query patterns can then be filtered by a person to remove queries with similar keywords but different intent. The filtered query patterns can then be used to generate a list of queries for each entity and attribute. When a user submits a query, the query can be compared to the list. If the query matches an entry on the list, the corresponding answer can be returned to the user.

The above methodology can provide a variety of advantages. The process allows for identification of query patterns with similar intent based on past user behavior. Thus, rather than attempting to guess likely query patterns, the invention allows commonly used query patterns to be detected automatically. These patterns can then be filtered by a person to avoid accidental association of an unrelated query with an answer. As a result, query patterns that have a similar intent can be identified in a flexible manner.

Entities and Attributes

The terms "entity" and "attribute" are used in the discussion below to describe various embodiments of the invention. An entity can be a person, place, object, or anything else that a user may desire to know a fact about. An entity corresponding to a person could be a position or job title, such as President of the United States, or an entity could be the individual holding that job. An attribute can be a fact, feature, quality, characteristic, or any other piece of information associated with an entity. Examples can include the height (attribute) of Mount Everest (entity), the titles of plays (attribute) by William Shakespeare (entity), the location (attribute) of the University of Washington (entity), and so on. Note that in many situations, an entity may also be considered an attribute relative to another entity. For example, the Tempest (entity) is a play authored by William Shakespeare (attribute). There are several colleges, including the University of Washington, that are included in colleges or universities (attribute) in Seattle, Wash. (entity).

Information regarding entities and attributes can be stored in any convenient format. For example, one or more databases can be used to store information about entities and corresponding attributes. The one or more databases can be located on a single computer, or the one or more databases can be stored in multiple locations, such as data servers connected by a network. The source of the information regarding entities and attributes can be compiled in any convenient manner.

Optionally, the entity and attribute information can be a third party database of information.

Initial Query Terms and Constructing Basic Queries

The process of identifying query formats can begin with selecting a group of entities that share a related attribute. For example, a number of entities in the form of authors can have the attribute "books". This attribute contains any books by the corresponding entity author.

Based on an initial attribute and corresponding entities, initial query terms can be identified. For the initial attribute, common variants of the attribute can be identified. This can include plurals of a word as well as similar terms. For the attribute "book", this could lead to identification of the similar terms "books, "novel", "novels", and "works". Any convenient method for identifying similar terms can be used, and the number of similar terms identified can vary based on the method used. Alternatively, similar terms do not have to be generated for the attribute.

The entities having the attribute can also have common variants identified, if any. For example, the author Jane Austen might have a common variant in the form of Jane Austin (a spelling error). Issac Newton may also be referred to as just Newton. Any convenient method for identifying variants for an entity can be used. Alternatively, variants do not have to be generated for entities.

The entities can be combined with the attribute to provide an initial list of query terms. In an embodiment, the entities (including any variants) can be combined with the attribute (in the form of one or more attribute expressions) to form basic queries. These basic queries can be standard combinations of an entity plus an attribute. A standard list of basic queries can be used for all attributes, or each attribute can have a list of basic query formats for use in forming basic queries.

A logfile of queries submitted by users can then be analyzed to determine the query term combinations (entity and attribute) that have the highest frequency. Optionally, identification of frequent entity and attribute combinations can be determined by determining the frequency of basic queries for the entity and attribute combinations. For example, a logfile can be scanned for all queries that match either "entity attribute" or "attribute entity". Optionally, any variants for an entity or any similar terms for the attribute can be included. Based on the query term combinations in the logfile, the entities which occur with the highest frequency can be determined. These entities can then be used as the basis for detecting other query forms in the logfile. Any convenient number of entities can be selected based on the frequency count, such as the top five entities, or the top ten, or the top twenty, or any other convenient number. One of the goals of selecting the highest frequency entities for determining the query forms is to reduce the overall computational cost of determining the query forms. Thus, if it is desired, the selection of the highest frequency entities could be omitted, and all entities corresponding to an attribute could be used for determining query forms.

Generation of Query Formats

After selecting high frequency entity and attribute combinations, the entity and attribute combinations can be used as a basis for analyzing a query log. In the query log analysis, any query that contains at least one occurrence of the entity and at least one occurrence of the attribute can be selected. Optionally, the selected queries can be queries that contain exactly one occurrence each of the entity and the attribute. Optionally, the selected queries can include queries that contain a variant for the entity or a similar term for the attribute.

After selecting queries, any duplicate queries can optionally be eliminated. Eliminating the duplicate queries can assist with correctly determining the number of unique queries corresponding to a query format in a later part of the method. The number of duplicates can also be counted for later use.

The selected queries can then be modified to generalize the queries. In this example, generalizing the query means that the entity is removed or replaced. The goal of generalizing the queries is to identify common query formats independent of the entity (or any variants in the entities). For example, in the selected queries, the entities and any variants can be replaced with a character string as a placeholder. This can provide a series of query formats that are independent of a particular entity, but otherwise retain the different ways that users have incorporated an entity with the given attribute.

As an alternative, generalizing a query can include having both the entity and the attribute removed or substituted with a placeholder character string. Replacing only the entity can result in a query format that is specific to an attribute. Replacing both the entity and attribute provides a query format that can be used with various entity and attribute combinations.

After generalizing the selected queries, some of the generalized queries will be identical, as some queries will have differed only based on the entity. The generalized queries are aggregated to combine these identical queries. This results in a list of unique generalized queries. The number of occurrences of each query format prior to aggregation can also be counted. This number of occurrences can indicate the number of different entities associated with a query format. A higher number of entities associated with a query format can indicate a query format that is likely to be used regardless of the entity. A low number of entities associated with a query may indicate a query that is specific to an entity or a few entities. Note that the number of duplicate queries submitted for a given entity can also be tracked. Thus, for a given query format, it can be determined if the format is frequently used in general and/or if a format is frequently used for a specific entity.

The group of aggregated, generalized queries can now be reviewed to remove unrelated queries. Because queries were initially identified automatically based on the presence of a selected entity and a selected attribute, some queries with different intent may be included in the group. The group of queries can be reviewed by a person to remove any queries that are not related to the primary intent. For example, consider an attribute for an entity of "height". A number of entities could have this attribute, such as the height of a person, height of a building, height of a mountain, and so on. For an attribute of height, a related term for height could be the word "high". In the aggregated, generalized query formats for height, the following two formats might appear. The first format could be "how high is <entity>". The second format could be "springfield <entity> high school". The first format is clearly an appropriate query related to the height of an entity. A reviewer would keep this query format in the group. The second format is an example of inadvertent query overlap. An entity that occurs frequently for height also happened to be a name for a high school in the city of Springfield. This resulted in a query format that superficially matched the entity and attribute terms. The second query format, however, does not match the original intent of the entity and attribute combination, which was to learn the height of an entity. This second format can be filtered out as not being related to the height of an entity.

At this point, a group of query formats have been identified. Each query format can have an associated overall frequency and/or an associated entity specific frequency. The query formats have been filtered to remove formats unrelated to the original intent of the query and attribute combination. The group of filtered, aggregated, generalized formats can be used to generate a list of answered queries. The answered queries can be constructed by inserting each entity having the attribute into each query format. The resulting list of answered queries can be used to match a query submitted by a user. If a user submits a query that matches a query pattern, the corresponding attribute value can be returned as a responsive answer.

EXAMPLE OF OPERATION

FIGS. 6-9 provide examples of various intermediate stages of a method according to an embodiment of the invention. In the example shown in FIGS. 6-9, query formats (and answered queries) are determined for entities that have an attribute of books or other written works.

Figure 6:
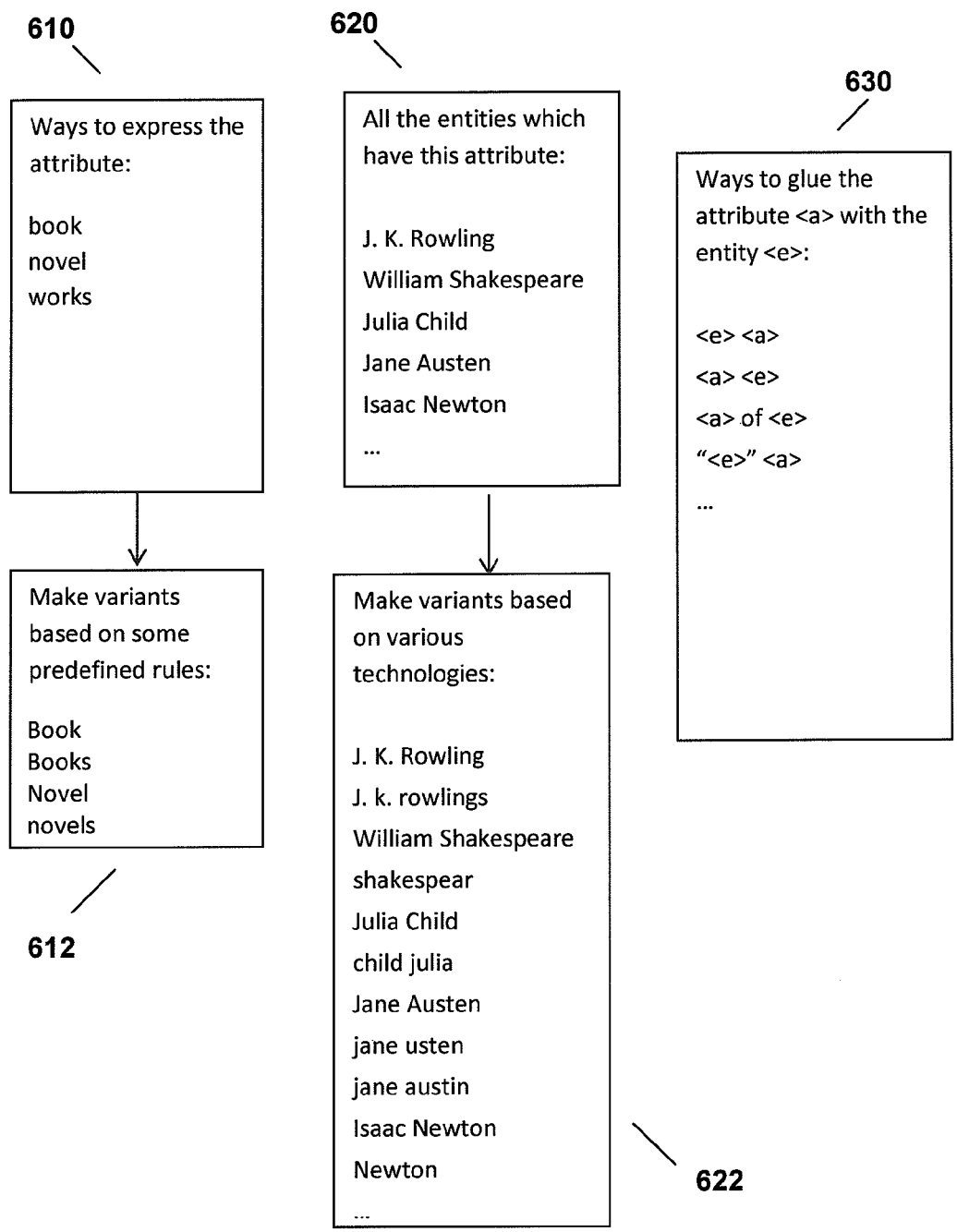

FIG. 6 shows several initial actions for the process of determining query formats and/or answered queries. In FIG. 6, the attribute is books. A listing 610 is available that provides similar terms for books. The listing 610 includes books, novels, and works. The listing 610 can be provided by any convenient method. It can be retrieved from a database, or it can be provided by a person who initiates the process. The listing 610 of similar terms can be supplemented with additional similar terms 612. The additional similar terms 612 shown in FIG. 6 represent plurals of the terms in listing 610. Common spelling mistakes or abbreviations could also be included in either listing 610 or in additional similar terms 612.

A portion of a list of entities 620 with information available for the attribute "books" is shown in FIG. 6. The portion of the list of entities 620 includes a few representative entities for purposes of illustrating this example. For each entity, variants 622 for the entity can optionally be determined. The variants 622 for the entities can be determined in any convenient manner, such as by consulting an online database site for common alternative ways to refer to the entity. Common spelling mistakes or abbreviations for the entity can also be included in variants 622.

A third initial action can be construction of basic queries 630 based on the attribute and corresponding entities. The basic queries 630 represent simple combinations of an entity and an attribute. These basic queries 630 can be used to identify entities that are frequently combined with the attribute. The list of basic queries 630 can be as long as desired. The basic queries 630 can be generated automatically regardless of the attribute, or each attribute can have a list of basic queries 630.

FIG. 7 shows an example of the results when basic queries 630 are substituted with the entities corresponding to an attribute. In FIG. 7, only a few representative entity and attribute combinations are shown. In some embodiments, each query in basic queries 330 can be substituted with each possible combination of attribute and corresponding entities. The resulting substituted basic queries shown in FIG. 7 can be used to identify frequent attribute and entity combinations by matching the substituted basic queries with a file of stored prior user queries.

The result of matching the substituted basic queries in FIG. 7 with queries from a logfile can provide results similar to those shown in Table 1.

TABLE 1

| | |
|---|---|
| J. K. Rowling books | 1000 |
| J. K. Rowling book | 500 |
| William Shakespeare works | 400 |
| Julia Child book | 200 |
| Jane Austen novels | 100 |
| Rowling novels | 60 |
| newton works | 50 |
| child julia book book | 20 |
| ... | |

In this example, Table 1 is a small sampling of the total results. After identifying the frequency for each substituted basic query, the substituted basic queries for each entity can be summed to identify the entities with the greatest frequency. For example, just based on the hypothetical results shown in Table 1, the entity J. K. Rowling appears at least 1560 times (1000 plus 500 plus 60) in association with the attribute "books", while the entity Julia Child appears at least 220 times (200 plus 20). The entities identified as having the greatest frequency in association with an attribute can then be used for analyzing query logfiles to identify query formats. Note that in another embodiment, this step of determining the frequency of entities can be omitted, and all entities having a given attribute can be used for analyzing a logfile for query formats.

After identifying the frequently occurring entities, the frequent entities can be used to determine all queries in a logfile that include both the entity and the attribute. A sample of some of the potential queries in a logfile is shown in Table 2, along with the frequency of the query and whether the query matches both an entity and an attribute.

TABLE 2

| query | frequency | valid? |
|---|---|---|
| books by j. k. rowling | 400 | yes |
| books by j. k. rowlings | 300 | yes |
| books by shakespeare | 200 | yes |
| books by julia child | 100 | yes |
| books by walala | 10 | no |
| articles by shakespeare | 100 | no |
| novels by j. k. rowling | 300 | yes |

Note that two of the queries shown in Table 2 represent queries that do not match both the entity and the attribute. The query "books by walala" matches the attribute, but "walala" was not identified as a frequent entity. As a result, these queries would be excluded. Similarly, the query "articles by Shakespeare" matches a frequent entity, but "articles" is not a similar term for the entity "books". Thus, this query would also be excluded.

For the remaining queries in Table 2, the frequency of the query can be noted. For the queries "books by j. k. rowling" and "books by j. k. rowlings", the frequency of these queries can be combined, as they represent the same query except for a spelling error. This spelling error represents a known spelling error or other variant for the entity. Otherwise a matching entity for the query would not be detected.

After noting the frequency, the queries identified from the logfile can be generalized. For the queries shown in Table 2, the queries generalize to only two formats. One format is "books by <entity>", with a frequency of 1000 (400 plus 300 plus 200 plus 100). The other format is "novels by <entity>", with a frequency of 300. Note that Table 2 provides only a sample of potential queries that match a frequent entity and an attribute. It is understood that any number of queries and corresponding query formats might match an entity and attribute combination. Thus, the number of generalized query formats can be arbitrarily large, depending on the contents of a query logfile that is analyzed.

FIG. 8 shows an example of the potential results from generalizing the query formats found in a query logfile. In FIG. 8, the column labeled "template" shows the generalized query format. To the left of the template column are two columns related to query frequency. The column titled "The number of distinct queries" represents the number of different entities that had at least one occurrence of this query format. The column titled "The number of queries" represents a sum of the frequency of occurrence for this query format for each entity. The number of distinct queries provides some indication of how common the query format is independent of the entity, while the number of queries indicates the overall usage of the query format. The remaining column in FIG. 8 indicates whether a person reviewing the query format would include the query format as being related to the original attribute. For example, the original attribute was "books". In this example, the attribute books does not include any time limitation for when a book was written. Instead, a separate attribute is available for new or recent books. As a result, even though the query format "<entity> new book" (row 5) is shown as fifth in the list based on distinct queries, it is excluded here as the query is not directed to the correct attribute. Similarly, the query format "read <entity> books online" would also be excluded by a reviewer.

FIG. 9 shows the final list of query formats generated after a reviewer excludes the query formats from FIG. 8 that are not related to the attribute "books". The query formats in FIG. 9 can be combined with all entities that have the attribute books to generate a list of answered queries. In an embodiment, an answered query can be constructed based on each query format in the list in combination with each query having the attribute books. For each entity, the resulting list of queries can be stored in association with the entity. Alternatively, all of the queries can be stored in a single list, and the entity can be identified separately when a match is detected. When a user submits a query to the search engine, the submitted query can be compared with the stored list of queries. If a match exists, the attribute value for the corresponding entity is provided to the user as an answer.

Having briefly described an overview of various embodiments of the invention, an exemplary operating environment suitable for performing the invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, query answer component 117, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, carrier wave, or any other medium that can be used to encode desired information and which can be accessed by the computing device 100. In an embodiment, the computer storage media can be selected from tangible computer storage media. In another embodiment, the computer storage media can be selected from non-transitory computer storage media.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like. The query answer component 117 represents a component that can include some or all of the functionality of one or more of the components described in association with FIG. 2 below.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
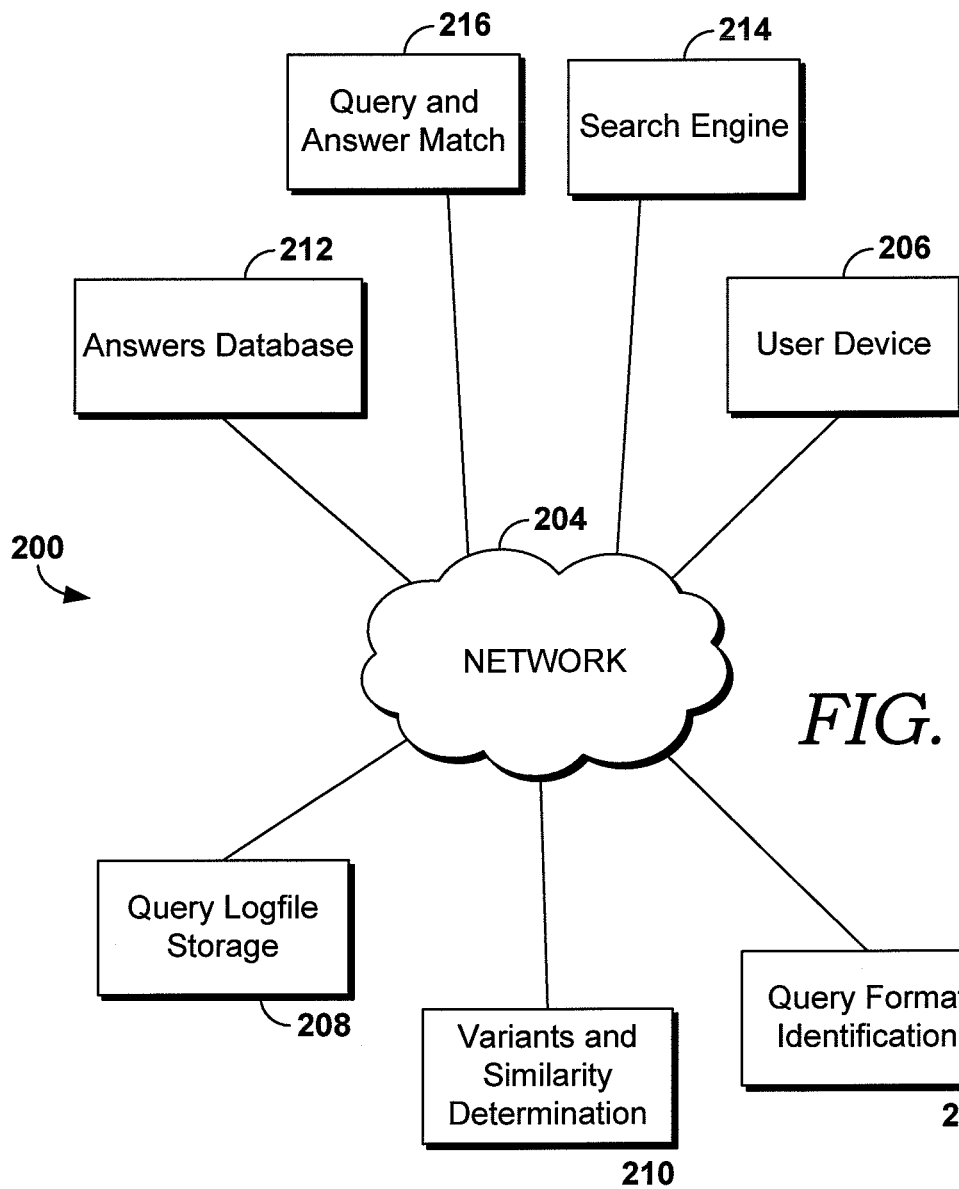
FIG. 2 schematically shows a network environment suitable for use in various embodiments of the invention.

Turning now to FIG. 2, a block diagram is illustrated, in accordance with an embodiment of the present invention, showing an exemplary computing system 200. It will be understood and appreciated by those of ordinary skill in the art that the computing system 200 shown in FIG. 2 is merely an example of one suitable computing system environment and is not intended to suggest any limitation as to the scope of use or functionality of embodiments of the present invention. Neither should the computing system 200 be interpreted as having any dependency or requirement related to any single component or combination of components illustrated therein. Further, the computing system 200 may be provided as a stand-alone product, as part of a software development environment, or any combination thereof.

The computing system 200 includes a user device 206, a search engine 214, an answers database 212, and a query and answer matching service 216. The computer system 200 further includes query logfile storage 208, variants and similarity determination component 210, and a query format identification component 218. The various portions of the computer system can be located on a single computer, or one or more of the various portions can be located on different computers and interact via a network 204 as shown in FIG. 2. The network 204 may include, without limitation, one or more local area networks (LANs) and/or wide area networks (WANs). Such networking environments are commonplace in offices, enterprise-wide computer networks, intranets and the Internet. Accordingly, the network 204 is not further described herein.

The one or more computers used for implementing the components shown in FIG. 2 may be any type of computing device, such as, for example, computing device 100 described above with reference to FIG. 1. By way of example only and not limitation, each of the user device 206, a search engine 214, an answers database 212, and a query and answer matching service 216. The computer system 200 further includes query logfile storage 208, a variants and similarity determination component 210, and a query format identification component 218 may be implemented using a personal computer, desktop computer, laptop computer, handheld device, mobile handset, consumer electronic device, and the like. Additionally, the user device 206 may further include a keyboard, keypad, stylus, joystick, and any other input-initiating component that allows a user to provide wired or wireless data to the network 204, e.g., verification inquires, web page addresses, and the like. It should be noted, however, that the present invention is not limited to implementation on such computing devices, but may be implemented on any of a variety of different types of computing devices within the scope of embodiments hereof.

The search engine 214 can be a conventional search engine that receives queries and returns lists of responsive documents. Queries from a user device 206 can be passed first through search engine 214, or the queries can be transferred directly to query and answer matching service 216 for identification of an answer to a query. The query and answer matching service 216 identifies an answer that corresponds to a query. This can be done by matching the query to a query format previously identified by query format identification component 218. After matching a query to a query format, a corresponding answer from answers database 212 can be identified based on the entity and the attribute from the query format. Alternatively, since the query format is determined ahead of time, answers database 212 can include a list of queries for matching with a potential query. The various entries in the list of queries can be associated with an answer, so that matching of a query in the query list automatically identifies the corresponding answer. The corresponding answer can then be provided to a user via user device 206.

Query format identification component 218 identifies the query formats that can be considered for matching. Using variants and similarity determination component 210 and logfiles from query logfile storage 208, the query format identification component 218 can determine query formats as described above. The query formats can be stored, as well as a listing of entities and attributes substituted into the query formats. These query formats and/or queries can then be matched with queries submitted by a user via user device 206.

Figure 3:
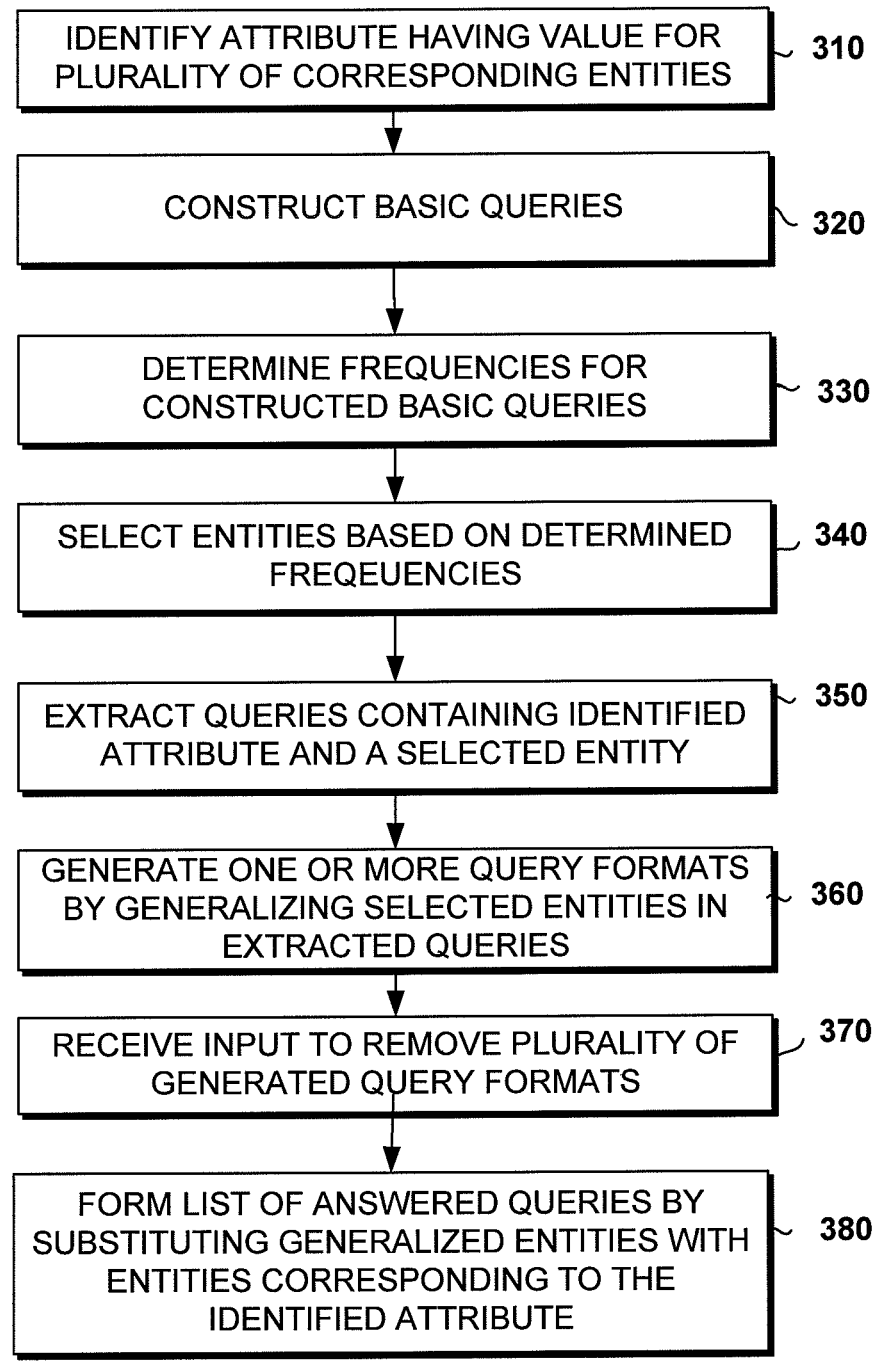
FIG. 3 shows a flow chart of a method according to an embodiment of the invention.

FIG. 3 depicts a flow chart showing a method according to an embodiment of the invention. In the embodiment shown in FIG. 3, an attribute having an attribute value for a plurality of corresponding entities is identified 310. The attribute value can be a fact, feature, number, or a series of facts, features or numbers. For example, for an attribute "books", the attribute value can be a listing of all of the books written by an entity. In FIG. 3, basic queries are constructed 320 based on combinations of the attribute with the plurality of corresponding entities. Frequencies can then be determined 330 for the constructed basic queries in a first query logfile. One or more entities can be selected 340 based on the determined frequencies. Queries can then be extracted 350 from a second query logfile. The extracted queries can contain the identified attribute and a selected entity. Note that the first query logfile and the second query logfile can be the same or different. After extraction, one or more query formats can be generated 360 by generalizing the selected entities in the extracted queries. Optionally, the attribute in the extracted queries can also be generalized. An input can be received 370 to remove a plurality of the generated query formats. This input can represent the input of a human reviewer. The human reviewer can screen the generated query formats to remove query formats that are not related to the attribute. A list of answered queries can then be formed 380 by substituting the generalized entities in the one or more query formats with the plurality of entities corresponding to the identified attribute, each answered query corresponding to an attribute value associated with the entity and the attribute in the query. Optionally, the query formats can be filtered prior to formation of the answered queries. The filtering can be based on a frequency of occurrence of the query format in the second logfile. The frequency can represent a total frequency for the query format, or a unique query frequency for the query format.

Figure 4:
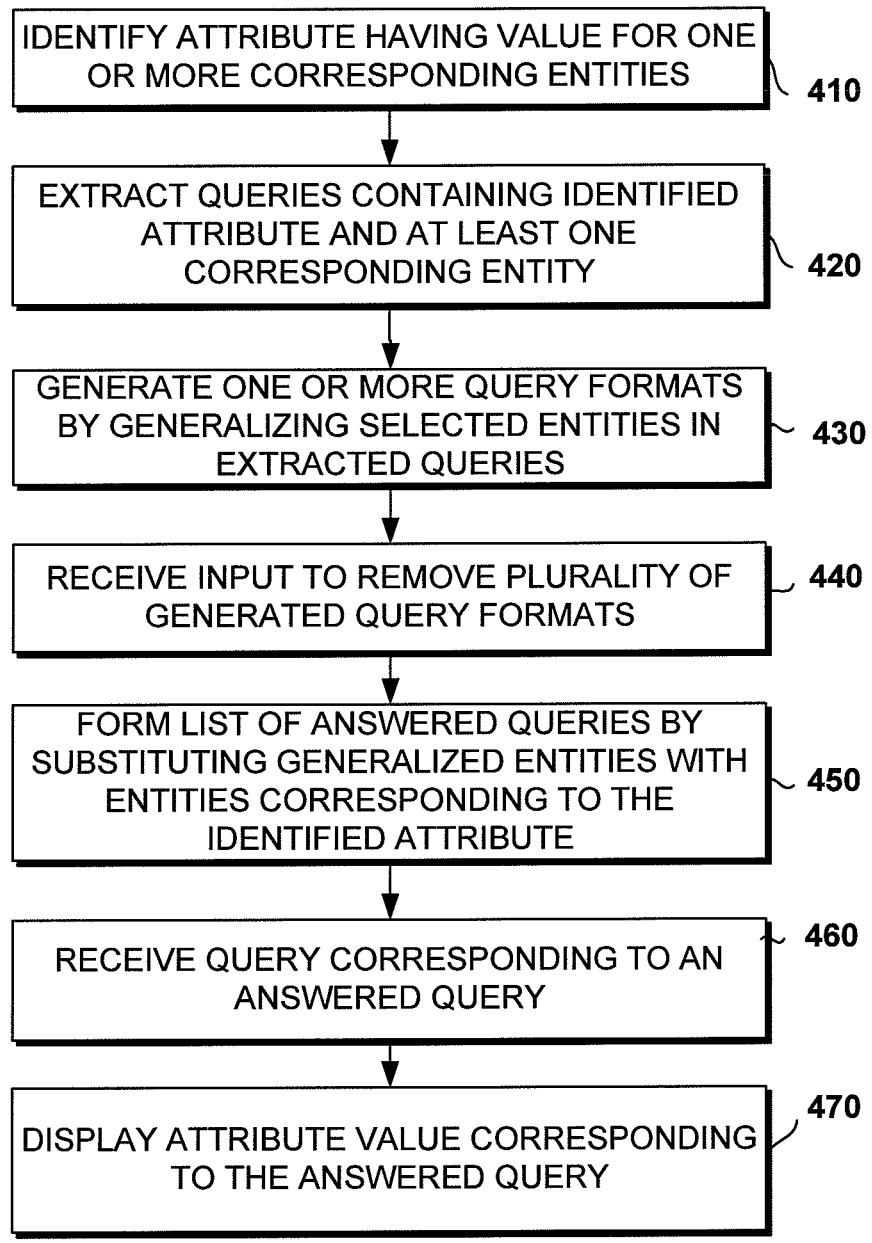
FIG. 4 shows a flow chart of a method according to an embodiment of the invention.

FIG. 4 depicts a flow chart showing a method according to another embodiment of the invention. In the embodiment shown in FIG. 4, an attribute having an attribute value for a plurality of corresponding entities is identified 410. Queries are extracted 420 from a query logfile. The extracted queries can contain the identified attribute and at least one corresponding entity. One or more query formats can be generated 430 by generalizing the entities in the extracted queries. An input can be received 440 to remove a plurality of the generated query formats. A list of answered queries can be formed 450 by substituting the generalized entities in the one or more query formats with the one or more entities corresponding to the identified attribute. Each of the answered queries can correspond to an answer associated with the entity and the attribute in the query. After forming the list of answered queries, a query corresponding to an answered query can be received 460. The attribute value corresponding to the answered query can be displayed 470 in response to the received query. Optionally, the attribute value can be obtained from a third party database, such as by providing at least the entity and the attribute to the third party database and requesting an answer.

Figure 5:
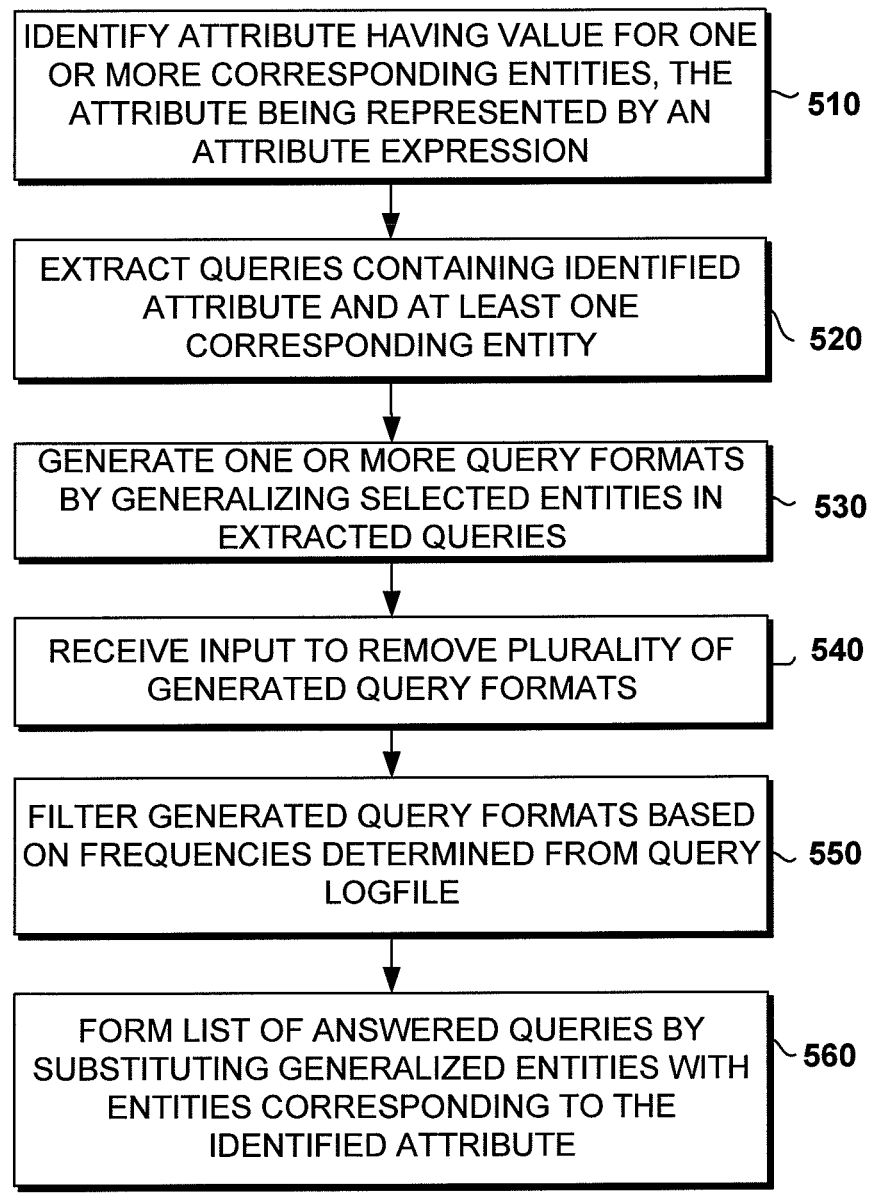
FIG. 5 shows a flow chart of a method according to an embodiment of the invention.

FIG. 5 depicts a flow chart showing a method according to yet another embodiment of the invention. In the embodiment shown in FIG. 5, an attribute having an attribute value for one or more corresponding entities can be identified 510. The attribute can be represented by one or more attribute expressions. Queries can be extracted 520 from a query logfile. The extracted queries can contain an attribute expression corresponding to the identified attribute and at least one corresponding entity. One or more query formats can be generated 530 by generalizing the entities and the attribute expressions in the extracted queries. An input can be received 540 to remove a plurality of the generated query formats. The generated query formats can be filtered 550 based on frequencies determined from the query logfile. A list of answered queries can be formed 560 by substituting the generalized attribute with an attribute expression and substituting the generalized entity with an entity corresponding to the attribute for the attribute expression. Each of the answered queries can correspond to an attribute value associated with the entity and the attribute in the query.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. A method for associating user queries with answers, comprising:
   providing a processor and a memory containing computer executable instructions; and
   executing, by the processor, the computer executable instructions to provide a method comprising:
   identifying an attribute having an attribute value for a plurality of corresponding entities;
   constructing basic queries based on combinations of the attribute with the plurality of corresponding entities;
   determining frequencies for the constructed basic queries in a first query logfile;
   selecting one or more entities based on the determined frequencies;
   extracting queries from a second query logfile, the extracted queries containing the identified attribute and a selected entity;
   generating one or more query formats by generalizing the selected entities in the extracted queries;
   receiving an input to remove a plurality of the generated query formats; and
   forming a list of answered queries by substituting the generalized entities in the one or more query formats with the plurality of entities corresponding to the identified attribute, each answered query corresponding to an attribute value associated with the entity and the attribute in the query.

2. The method of claim 1, further comprising:
   receiving a query;
   matching the received query with an answered query; and
   displaying the attribute value corresponding to the answered query.

3. The method of claim 1, further comprising:
   receiving a query;
   matching the received query with an answered query;
   forwarding at least the attribute and the entity from the received query to an answer database;
   receiving an attribute value; and
   displaying the attribute value corresponding to the answered query.

4. The method of claim 1, wherein the first query logfile is the same as the second query logfile.

5. The method of claim 1, wherein an extracted query containing the identified attribute comprises an extracted query containing an attribute expression corresponding to the identified attribute.

6. The method of claim 1, wherein generating one or more query formats comprises replacing the selected entities with a placeholder expression.

7. The method of claim 1, wherein the plurality of corresponding entities includes variants for at least one of the entities.

8. The method of claim 1, further comprising filtering the generated query formats based on frequencies determined from the second query logfile.

9. The method of claim 1, wherein the generated query formats are filtered based on at least one of a total number of queries corresponding to the generated query format and a number of distinct queries corresponding to the generated query format.

10. The method of claim 1, wherein determining frequencies of basic queries in a first query logfile comprises:
    determining a frequency for each basic query, wherein at least two basic queries contain variants of an entity; and
    aggregating the frequency for the basic queries containing the variants of the entity.

11. The method of claim 1, wherein the input to remove the plurality of generated query formats comprises input from a person reviewing the generated query formats.

12. A method for associating user queries with answers, comprising:
    providing a processor and a memory containing computer executable instructions; and
    executing, by the processor, the computer executable instructions to provide a method comprising:
    identifying an attribute having an attribute value for one or more corresponding entities;
    extracting queries from a query logfile, the extracted queries containing the identified attribute and at least one corresponding entity;
    generating one or more query formats by generalizing the entities in the extracted queries;
    receiving an input to remove a plurality of the generated query formats;
    forming a list of answered queries by substituting the generalized entities in the one or more query formats with the one or more entities corresponding to the identified attribute, each answered query corresponding to an answer associated with the entity and the attribute in the query;
    receiving a query corresponding to an answered query; and
    displaying the attribute value corresponding to the answered query.

13. The method of claim 12, wherein an extracted query containing the identified attribute comprises an extracted query containing an attribute expression corresponding to the identified attribute.

14. The method of claim 12, further comprising matching the received query with an answered query.

15. The method of claim 12, further comprising filtering the generated query formats based on frequencies determined from the query logfile.

16. The method of claim 15, wherein the generated query formats are filtered based on at least one of a total number of queries corresponding to the generated query format and a number of distinct queries corresponding to the generated query format.

17. The method of claim 12, wherein generating one or more query formats comprises replacing the entities with a placeholder expression.

18. A method for associating user queries with answers, comprising:
  identifying an attribute having an attribute value for one or more corresponding entities, the attribute being represented by one or more attribute expressions;
  extracting queries from a query logfile, the extracted queries containing an attribute expression corresponding to the identified attribute and at least one corresponding entity;
  generating one or more query formats by generalizing the entities and the attribute expressions in the extracted queries;
  receiving an input to remove a plurality of the generated query formats;
  filtering the generated query formats based on frequencies determined from the query logfile; and
  forming a list of answered queries by substituting the generalized attribute with an attribute expression and substituting the generalized entity with an entity corresponding to the attribute for the attribute expression, each answered query corresponding to an attribute value associated with the entity and the attribute in the query.

19. The method of claim 18, wherein the at least one corresponding entity in the extracted queries is selected based on a frequency of the at least one corresponding entity in the query logfile.

20. The method of claim 19, further comprising:
  constructing basic queries based on combinations of the identified attribute with the one or more corresponding entities;
  determining frequencies for the basic queries in the query logfile; and
  selecting the at least one corresponding entity based on the determined frequencies.

* * * * *